United States Patent Office 2,947,757
Patented Aug. 2, 1960

2,947,757

PROCESS FOR PREPARING 5-HYDROXY-TRYPTAMINE THROUGH NEW INTERMEDIATES

Romeo Justoni, Milan, and Raffaele Pessina, Casatenovo Brianza, Italy; said Pessina assignor to Francesco Vismara Società per Azioni, Casatenovo Brianza, Italy No Drawing. Original application Feb. 21, 1956, Ser. No. 566,776. Divided and this application Feb. 18, 1957, Ser. No. 644,706

Claims priority, application Great Britain Apr. 1, 1955

7 Claims. (Cl. 260—319)

This invention relates to a new process for preparing the therapeutically active 5-hydroxy-tryptamine having the formula:

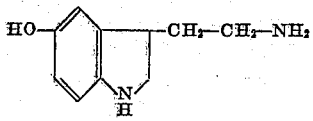

and to a group of new substances which we have found to be excellent intermediates for the synthesis of the same.

Various expensive procedures for the synthesis of 5-hydroxy-tryptamine have already been proposed; we have now discovered a new process for the preparation of this compound employing certain novel intermediates which are illustrated below, which is more advantageous than the processes proposed hereto.

Most of the new intermediates used in our new process are indole derivatives which may be represented by the following general formula:

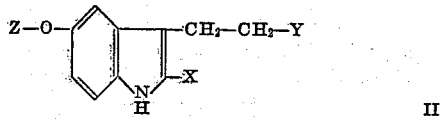

where: X is selected from the group consisting of: H, COOH, COOCH$_3$, COOC$_2$H$_5$, and the like alkyl-ester groups; Y being —COOH or —COOR (R being a straight or branched alkyl group containing up to 5 carbon atoms); when X is H, Y also being, besides the groups mentioned above, a member of the class consisting of: —CO—NH—NH$_2$, —CON$_3$, —N=CO, —NH—COOR (R being a straight or branched alkyl group containing up to 5 carbon atoms) or —NH—COOCH$_2$—C$_6$H$_5$; Z being a benzyl group C$_6$H$_5$—CH$_2$—, but being either C$_6$H$_5$—CH$_2$ or H, when X is H and Y is a uretane function as —NH—COOR (R having the above stated meaning).

Besides the indole derivatives, represented by the above said general formula, other new substances which we have discovered as intermediates in the new process for preparing 5-hydroxy-tryptamine are: the 5-benzyloxy-tryptamine benzoate of Formula IIIa and the 5-benzyloxy-tryptamine salicylate of Formula IIIb;

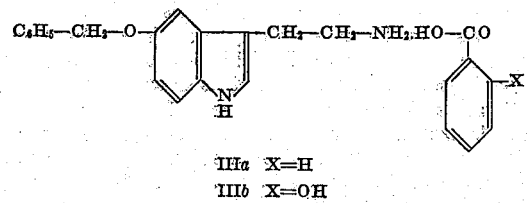

IIIa X=H
IIIb X=OH the p.benzyloxy-phenylhydrazone of the α-keto adipic acid, having the formula

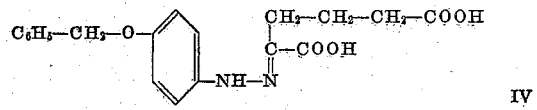

IV and the corresponding di-alkyl esters, formed with straight or branched alkyl groups containing up to 5 carbon atoms.

One of the objects of the present invention is to provide a new process for preparing 5-hydroxy-tryptamine.

Another object is to provide the above said new intermediates compounds and methods for the production thereof.

The starting materials are well known cheap substances which may be technically manufactured, by easy and economical procedures, according to methods already described in the chemical literature; they are: p.benzyloxy-aniline hydrochloride (which is obtained from p.nitrophenol and benzylchloride, by passing through p.nitrophenol-benzylether) and α-carbethoxy-cyclopentanone (which is obtained from the di-ethyl ester of the adipic acid by treatment with sodium).

The initial step of our invention consists in the preparation of the above mentioned α-keto-adipic acid p.benzyloxy-phenylhydrazone (IV).

This new compound is readily obtained as follows: p.benzyloxy-aniline hydrochloride is diazotised in an excess of aqueous hydrochloric acid with sodium nitrite and, after addition of sodium acetate, the obtained diazocompound is reacted with α-carbethoxy-cyclopentanone; the precipitated solid product of the coupling having the formula

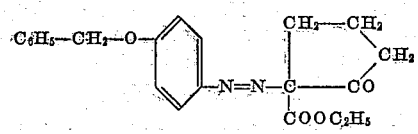

is filtered and treated to ebullition with aqueous sodium hydroxide; acidification yields the new α-keto-adipic acid p.benzyloxy-phenylhydrazone of Formula IV (M.P. 148–149° C., from dilute ethanol).

By heating in a boiling anhydrous solvent—selected from the class consisting of benzene and its methyl homologues and dioxan—in the presence of a mineral acid the α-keto-adipic acid p.benzyloxy-phenylhydrazone yields the new 5-benzyloxy-indole-2-carboxyl-3-β-propionic acid (Formula II above, where X and Y=COOH; Z=CH$_2$—C$_6$H$_5$; M.P. 191–192° C. from dilute alcohol).

In a strictly analogous way, but by a somewhat different procedure, the same 5-benzyloxy-indole-2-carboxyl-3-β-propionic acid may be obtained through the corresponding dialkyl esters. For this purpose the new di-alkyl esters of α-keto-adipic acid p.benzyloxy-phenylhydrazone—which are easily obtained by treatment of the α-keto-adipic acid p.benzyloxy-phenylhydrazone with an esterifying agent selected from the class consisting of methylalcohol, ethylalcohol, and other like alcohol, diazomethane, diazoethane and like diazo aliphatic derivatives containing up to 5 carbon atoms (e.g. the di-methyl ester of the acid of Formula IV; M.P. 114–115.5° C., from methanol)—are treated to ebullition in the presence of a mineral acid in an anhydrous alcohol containing up to 5 carbon atoms, as well as in another anhydrous solvent selected from the above mentioned class consisting of benzene and its methyl homologues and dioxan, yielding the corresponding indole derivatives: e.g. the di-methyl 5-benzyloxy-indole-2-carboxy-3-β-propionate (Formula II, where X and Y =—COOCH$_3$; Z=—CH$_2$—C$_6$H$_5$; M.P. 122–123.5° C., from ethanol), the analogous di-ethyl ester (Formula II, where X and Y=—COOC$_2$H$_5$; Z=—CH$_2$—C$_6$H$_5$; M.P. 108–109° C., from ethanol) and the like. We point out that esterification of the α-keto-adipic acid p.benzyloxy-phenylhydrazone and conversion into the corresponding indole derivative may be also carried out in continuation in the same alcoholic solvent in presence of a mineral acid without isolating the intermediate ester of the acid of Formula IV. Alkaline hydrolysis of the said indole di-esters (Formula II, where X and Y are carboxyl alkyl groups and Z is benzyl group) furnishes 5-benzyloxy-indole-2-carboxy-3-β-propionic acid.

This indole dicarboxylic acid is then transformed by thermic decarboxylation into a benzyloxy-indole mono-carboxylic acid (Formula II above where: Y=COOH, X=H and Z=—CH$_2$—C$_6$H$_5$) which, besides the 5-benzyloxy group, contains in the indole nucleus, only a CH$_2$—CH$_2$—COOH side-chain in 3-position. This new compound is submitted to a number of transformations, through a series of intermediates, in order to convert the carboxylic-3-side-chain into a —CH$_2$—CH$_2$—NH$_2$ side-chain, and to convert the 5-benzyloxy-group into a free 5-hydroxyl group.

In practicing these steps of our invention, 5-benzyloxy-indole-2-carboxyl-3-β-propionic acid is heated preferably at 190–230° C., alone or in solution and/or suspension in an inert high-boiling liquid, selected from the class consisting of tetrahydronaphthalene, decahydronaphthalene and neutral petroleum derivatives having a boiling point above 190° C. such as paraffin oil; mono-decarboxylation of the dicarboxylic acid occurs and 5-benzyloxy-indole-3-β-propionic acid (Formula II where: Y=COOH, X=H and Z=—CH$_2$—C$_6$H$_5$; M.P. 163–165° C., from dilute ethanol) is obtained.

This indole mono-carboxylic acid is esterified with a low molceular alcohol in order to obtain a corresponding new ester: for example the methyl-ester (Formula II where: Y=COOCH$_3$, X=H and Z=—CH$_2$—C$_6$H$_5$; M.P. 98–101° C., from methanol), the ethyl ester (Formula II where: Y=COOC$_2$H$_5$, X=H and

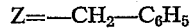

M.P. 62–63° C., from hexane) and ether similar esters with alkyl groups containing up to 5 carbon atoms.

By boiling with an alcoholic hydrazine hydrate solution the so obtained ester is then converted into the corresponding hydrazide (Formula II, where:

Y=CO—NH—NH$_2$

X=H and Z=—CH$_2$—C$_6$H$_5$; M.P. 137–138° C., from dilute ethanol).

By treating the said hydrazide with sodium nitrite and an acid in presence of water and of a solvent, selected from the group consisting of ether, benzene and its methyl homologues and aliphatic alcohols containing 4 or 5 carbon atoms, the hitherto unknown azide (Formula II, where: Y=CON$_3$, X=H and Z=—CH$_2$—C$_6$H$_5$) is readily obtained.

As we have verified this azide—by pyrolysis at 60–140° C., in an inert solvent, and subsequent mild hydrolysis of the so formed isocyanate (Formula II where: Y=NCO, X=H and Z=—CH$_2$—C$_6$H$_5$) with an aqueous mineral acid—may be directly transformed into 5-benzyloxy-tryptamine which, in its turn, may be converted into 5-hydroxy-tryptamine. However we point out that this way of transforming the above azide into 5-hydroxy-tryptamine furnishes only a very poor yield.

On the contrary we have discovered that it is possible in the practice of our invention to convert in a high yield the said azide into 5-hydroxy-tryptamine by a better indirect procedure through certain further intermediate compounds. The conversion is carried out as follows. The azide is heated at 60–140° C. with an alcohol selected from the class consisting of methyl alcohol, ethyl alcohol, other low molecular alcohols containing up to 5 carbon atoms and benzyl alcohol. Pyrolysis occurs and the transitorily formed isocyanate, by reaction with the alcohol employed, yields an urethane [Formula II where: X being H and Z=—CH$_2$—C$_6$H$_5$, Y is a member of the class consisting of: NH—COOCH$_3$, NH—COOC$_2$H$_5$, NH—COOC$_3$H$_7$ (normal and iso), NH—COOC$_4$H$_9$ (normal and isomers), NH—COOC$_5$H$_{11}$ (normal and isomers), NH—COOCH$_2$—C$_6$H$_5$]. The constitution of these urethanes is also clearly illustrated by the following general formula:

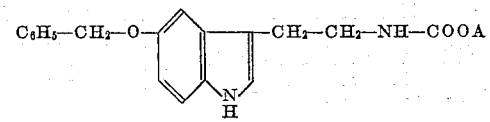

where: A=alkyl or aralkyl group, according to the alcohol employed in its preparation. For example employing methanol the methyl-urethane—i.e. the β-[3-(5-benzyloxy)-indolyl]-ethyl carbamic acid methyl ester— (Formula V where: A=—CH$_3$; M.P. 94–95° C.—from benzene by mixing with a small quantity of hexane—) is obtained. Similarly: ethanol yields the ethyl urethane (Formula V where: A=—C$_2$H$_5$; M.P. 87–88° C.—from benzene with hexane—); isoamyl alcohol yields the corresponding isoamylurethane (Formula V where:

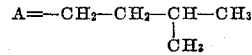

non crystalline pale yellow glass); benzyl alcohol yields the benzyl urethane (Formula V where:

M.P. 72–73° C.—from benzene with hexane—).

The urethane is then subjected to a mild catalytic hydrogenolysis in the presence of a palladium catalyst in an alcohol solution; by removal of the benzyl group from the 5-benzyloxy function, the corresponding non-benzylated urethane having a free 5-hydroxyl group is formed (Formula II where X and Z=H; Y is a member of the class consisting of: NH—COOCH$_3$,

NH—COOC$_2$H$_5$, NH—COOC$_3$H$_7$ (normal and iso), NH—COOC$_4$H$_9$ (normal and isomers), NH—COOC$_5$H$_{11}$ (normal and isomers),

NH—COOCH$_2$—C$_6$H$_5$ hydrolysis of the latter, in an alcohol solution, employing as hydrolysing agent a mineral acid in the presence of water, gives, by splitting off the carbamic ester group, the desired 5-hydroxy-tryptamine (Formula I) which is isolated in the form of its picrate, or oxalates, or of its well known double salt: 5-hydroxy-tryptamine-creatinine sulfate.

Particularly when the benzyl-urethane derivative (Formula V where: A=—CH$_2$—C$_6$H$_5$, or Formula II where: Y=NH—COO—CH$_2$C$_6$H$_5$; X=H and

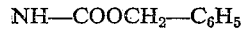

is prepared as intermediate, the catalytic hydrogenolysis thereof in the presence of an aqueous alcohol and a mineral acid, furnishes directly a very high yield of 5-hydroxy-tryptamine.

Again we have found that the conversion of any intermediate 5-benzyloxy-urethane (Formula V) into 5-hydroxy-tryptamine may be obtained by carrying out the same reactions—hydrogenolysis and hydrolysis—in an inverted order, i.e. firstly hydrolysis and then hydrogenolysis. In this case hydrolysis of the urethane in the presence of a mineral acid yields 5-benzyloxy-tryptamine which is isolated in the form of its salicylate or benzoate.

Catalytic hydrogenolysis either of one or the other salt [benzoate or salicylate of 5-benzyloxy-tryptamine (IIIa and IIIb)] in an alcohol solution gives a solution containing the corresponding salts of 5-hydroxy-tryptamine, from which the indole base may be isolated in the form of its picrate. In order that the invention may be well understood the following examples are given by way of illustration only:

Example 1

(a) 100 g. of p.amino-phenol-benzyl ether hydrochloride in 120 cc. of water and 76 cc. of concentrated hydrochloric acid are diazotised with 32.3 g. of sodium nitrite dissolved in 100 cc. of water. 120 g. of sodium acetate are added and then, with continuous agitation at 0° C., the solution is coupled with 66.5 g. of α-carbethoxy-cyclopentanone. Agitation is continued for three hours allowing the temperature to rise to 20° C. The formed solid product is filtered, washed with water, mixed with 1200 cc. of a 5% sodium hydroxide solution and heated on steam bath for three hours. The warm solution is neutralised to pH 7.5 with dilute hydrochloric acid and filtered with charcoal; after cooling the α-keto-adipic acid p.benzyloxy-phenylhydrazone is precipitated with hydrochloric acid; the yield of the filtered, washed and dried product is 128 g: yellow crystalline powder M.Pt. 146–148° C. (A sample recrystallised from 50% ethanol shows M.Pt. 148–149° C.; the determination of N content is in agreement with the formula $C_{19}H_{20}O_5N_2$: N percent calc. 7.86; N percent found 7.98.)

(b) A solution of 125 g. of the above α-keto-adipic acid p.benzyloxy-phenylhydrazone in 1250 cc. of dioxan containing 5% of dry hydrogen chloride is refluxed over a period of twenty minutes. After cooling the formed ammonium chloride is filtered by suction and washed with a little of dioxan. The clear filtrate is adjusted to pH 8 by adding a 10% aqueous sodium carbonate solution. The solvent is then distilled at 20–30 mm. pressure so obtaining about 300–400 cc. of a concentrated residual solution which, after neutralisation to pH about 7.2, is decolorised with charcoal and filtered. The filtrate is made acid to Congo red with hydrochloric acid thus precipitating the crude 5-benzyloxy-indole-2-carboxyl-3-β-propionic acid which is collected on a Büchner funnel, washed with water until the washings are neutral to litmus and dried on steam bath. The yield of the crude product melting at about 171–173° C. is 103 g. After repeated crystallisations from aqueous ethanol (1:1) 80 g. of pure, white 5-benzyloxy-indole-2-carboxyl-3-β-propionic acid melting at 188–190° C. are obtained. (An analytical sample shows M.Pt. 191– 192° C.; determination of N content gives values according to the formula $C_{19}H_{17}O_5N$: N percent calc. 4.12; N percent found 4.06.)

This step (b) may be carried out also employing instead of dioxan the benzene or toluene as solvent for the indole cyclisation. In this case however the yields are lower.

(c) Four 20 g. portions of 5-benzyloxy-indole-2-carboxyl-3-β-propionic acid, suspended in four 200 cc. portions of paraffin oil, are heated at ca. 210° C. in an oil bath; melting and decarboxylation occurs. The heating is continued for one and one-half hours. After cooling at ca. 60° C., the mixture is extracted with 300 cc. of aqueous 10% sodium carbonate solution: the pH of the obtained brown solution is then adjusted to about 7.2 and the solution filtered with charcoal from separated tar. By acidification with dilute hydrochloric acid, 62 g. of crude 5-benzyloxy-indole-3-β-propionic acid, melting at 150–151° C. with sintering at 118° C. separates off. This product recrystallised from the minimal amount of 50% aqueous ethanol melts at 153–156° C.; yield 42.8 g. (61% of the theoretical amount). (An analytical sample twice recrystallised from 50% ethanol melts at 163–165° C. and the nitrogen determination is in good agreement with formula $C_{18}H_{17}O_3N$: N percent calc. 4.74; N percent found 4.79.)

(d) A solution of 42 g. of the above 5-benzyloxy-indole-3-β-propionic acid in 420 cc. of absolute methanol, containing 3% of dry hydrogen chloride, is refluxed for a period of two hours. After cooling, the mixture is poured into a solution of 43 g. of sodium bicarbonate in 900 cc. of water. The separated crystalline brownish solid is collected on a filter and washed with water giving 43.3 g. of methyl-5-benzyloxy-indole-3-β-propionate: M.Pt. 98–99° C. (An analytical sample recrystallised from methanol shows M.Pt. 100–101° C: for $C_{19}H_{19}O_3N$: N percent calc. 4.53; N percent found 4.37.)

(e) A mixture of 43 g. of the above methyl-5-benzyloxy-indole-3-β-propionate, 1160 cc. of ethanol and 63 cc. of hydrazine hydrate is heated under reflux for one hour. After removal under reduced pressure of most of the solvent, the residual solution is diluted with an equal volume of water, and the precipitated crystalline solid is filtered and washed with water. The M.Pt. of the crude hydrazide is 133–135° C. After crystallisation from 70% ethanol, pure 5-benzyloxy-indole-3-β-propionhydrazide is obtained in an amount of 40.8 g. (96% of the theoretical amount): M.Pt. 134–136° C. (An analytical sample, recrystallised from water, melts at 137–138° C.: for $C_{18}H_{19}O_2N_3$: N percent calc. 13.59, N percent found 13.70.)

(f) To a solution of 40 g. of the above hydrazide in 120 cc. of acetic acid, 510 cc. of water chilled to 0° C. and 330 cc. of benzene are added with stirring. The resulting mixture is then treated with 100 cc. of a 10% aqueous sodium nitrite solution, stirring being continued for five minutes more. After separating the benzene layer, the aqueous phase is extracted twice with 330 cc. portions of benzene. The to 0° C. cooled combined benzene extracts, are washed firstly with a cooled dilute sodium bicarbonate aqueous solution and then with cooled water until neutral and dried over finely powdered anhydrous sodium sulfate. (A sample—15 cc.—of the filtered benzene solution, evaporated to dryness under reduced pressure at room temperature, gives a yellow crystalline residue of crude 5-benzyloxy-indole-3-β-propionazide which begins to decompose at 45° C.)

(g) The above benzene solution is added dropwise to 3300 cc. of boiling anhydrous methanol. Continuous distillation of azeotropic mixture of methanol and benzene occurs.

When all the benzene had been added and distilled, the residual methanol solution is refluxed for one hour and then evaporated under reduced pressure to dryness thus obtaining a brownish oil. A concentrated benzene solution of this oil is poured over 70 g. of aluminum oxide and the formed β-[3-(5-benzyloxy)-indolyl]-ethyl carbamic acid methyl ester is completely eluted by washing the aluminum oxide with benzene. Evaporation of benzene solution at reduced pressure to a small volume (about 150 cc.) and dilution with 15 cc. of hexane gives 27 g. of the methylurethane as white needles M.Pt. 90–93° C. The mother liquors are again treated with aluminum oxide so obtaining a further amount of the same product. Total yield 31.5 g. (An analytical sample twice recrystallised from benzenehexane melts at 94–95° C.: the nitrogen content is in good agreement with the formula $C_{19}H_{20}O_3N_2$: N percent calc. 8.64, N percent found 8.72.)

(h) A solution of 31 g. of the above methylurethane in 1000 cc. of methanol is treated with hydrogen with continuous stirring at five atm. pressure (room temperature: about 25° C.) in presence of 15 g. of a 10% palladium on carbon catalyst until no more hydrogen was adsorbed (about five hours). The filtered methanolic solution contains β-[3-(5-hydroxy)-indolyl]-ethyl carbamic acid methyl ester. It was then evaporated under reduced pressure to a volume of about 400 cc.

(That the debenzylation is accomplished is proved by the fact that a sample of this solution treated in an alkaline medium with an aqueous solution of diazotised sulphanilic acid gives a red colour so confirming the presence of a substance having a free phenolic group.)

The crude methanolic solution containing the β-[3-(5-hydroxy)-indolyl]-ethyl carbamic acid methylester is refluxed with 150 cc. of dilute hydrochloric acid (1:1) for 30 minutes to hydrolyse the carbamic ester. The greenish solution, after addition of 9 g. of crystallised sodium acetate, is neutralised to Congo red with sodium bicarbonate and filtered from the separated sodium chloride.

(i) 20.8 g. of picric acid are added to the filtrate, and most of the alcohol is evaporated under reduced pressure. The residual orange-red mixture is diluted to about 400 cc. with water, warmed to 50–65° C. and filtered with charcoal: by cooling 5-hydroxy-tryptamine picrate separates off as red needles M.Pt. 185–187° C. with dec.; after concentration of the mother liquors under reduced pressure a further amount of the same picrate is obtained. (A sample recrystallised from water melts at 196–197° C. and a mixed melting point with an authentic sample of 5-hydroxy-tryptamine picrate gives no depression.)

Example 2

(a) α-Keto-adipic acid p.benzyloxy-phenylhydrazone is prepared as described in step (a) of Example 1.

(b) 128 g. of this product are esterified employing an excess of a diazomethane methylene chloride solution; elimination of the solvent and of diazomethane excess gives 135 g. of the dimethyl-ester in form of yellow crystals. An analytical sample recrystallised from methanol shows M.Pt. 114–115.5° C. and the determination of N content is in agreement with the constitution of dimethyl - α - keto - adipate-p.benzyloxy-phenylhydrazone (for $C_{21}H_{24}O_5N_2$: N percent calc. 7.29; N percent found 7.18).

134 g. of the above crude dimethyl-ester are suspended in 1660 cc. of absolute methanol containing 10% of dry hydrogen chloride and refluxed for twenty minutes. After cooling, the reaction mixture is gradually poured into a cooled solution of 400 g. of sodium bicarbonate in 6000 cc. of water. The separated solid brown product is filtered, washed with water and crystallised from ethanol so obtaining 96.5 g. of white crystals, M.Pt. 120–121° C., of dimethyl-5-benzyloxy-indole-2-carboxy-3-β-propionate.

The mother liquors are evaporated to dryness at reduced pressure; the dried residue is again taken up with 350 cc. of absolute methanol containing 10% of dry hydrogen chloride and again refluxed for twenty minutes. By repeating the above treatment the reaction mixture gives, after crystallisation, further 12.2 g. of the same di-ester M.Pt. 118–120° C. Chromatography on aluminium oxide of a concentrated benzene solution of the residue of the evaporated mother liquors, by elution with hexane and hexane-benzene (1:1) followed by crystallisation from ethanol, gives further 4.3 g. of dimethyl-5-benzyloxy-indole-2-carboxy-3-β-propionate, M.Pt. 120–121° C.

In such a way the yield arises to 113 g. (89% of the theoretical amount). An analytical sample twice recrystallised from ethanol melts at 122–123.5° C.; the analytical values for N are in agreement with the formula $C_{21}H_{21}O_5N$ (N percent Calc. 3.81; N percent found 3.91).

This di-methyl-ester is hydrolysed to the corresponding 5-benzyloxy-indole-2-carboxyl-3-β-propionic acid as follows: to a solution of 112 g. of di-methyl-5-benzyloxy-indole-2-carboxyl-3-β-propionate in 2250 cc. of ethanol at 40° C., 98.5 g. of sodium hydroxide dissolved in 164 cc. of water are gradually added with stirring.

The mixture is then allowed to stand during 12 hours at room temperature (about 25° C.). After cooling at 0° C., the sodium salt, which separates off, is filtered on a Büchner funnel, washed with ethanol and dissolved in the strictly necessary quantity of water. The aqueous solution decolorised with charcoal is acidified with dilute hydrochloric acid and the precipitated indole-dicarboxylic acid is collected on a Büchner funnel, washed thoroughly with water and dried: yield 95 g. of white crystals M.Pt. 190–191° C. (92% of the theoretical amount).

(c) Five 19 g. portions of 5-benzyloxy-indole-2-carboxyl-3-β-propionic acid are heated at 215–225° C. in an oil bath; melting and decarboxylation occurs. The heating is continued for one hour. After cooling, all the obtained brownish solids are taken up with warm 70% aqueous ethanol and the solution filtered with charcoal. Dilution with water to bring the alcohol to 50% and cooling causes the separation of 73 g. of crude 5-benzyloxy-indole-3-β-propionic acid. This product recrystallised from the minimal amount of 50% aqueous ethanol melts at 153–156° C.; yield 49.5 g.

(d) (e) (f) (g) This 5-benzyloxy-indole-3-β-propionic acid (49 g.) is converted into β-[3-(5-benzyloxy)-indolyl]-ethyl carbamic acid methyl-ester (37 g.) by passing through the steps (d), (e), (f) and (g) of Example 1.

(h) The handling of this step for transforming the said methylurethane into 5-hydroxy-tryptamine is inverted respect to corresponding step as described in Example 1: the procedure is as follows: firstly hydrolysis is carried out by treating a solution of 37 g. of the methylurethane in 520 cc. of ethanol with 220 cc. of 6 N hydrochloric acid overnight at 40–50° C.: hydrolysis of the carbamic ester group occurs. To the so obtained solution containing 5-benzyloxy-tryptamine hydrochloride, 97.8 g. of sodium bicarbonate are added to neutralise the excess of hydrochloric acid. After filtration of the separated sodium chloride, 18.5 g. of sodium salicylate are added with stirring and the ethanol is evaporated under reduced pressure up to a residual volume of about 250 cc. By cooling crystallisation occurs; the collected 5-benzyloxy-tryptamine salicylate, washed with a little water and dried, forms yellow crystalline needles melting at 167–169° C.; yield 18.5 g. (A water recrystallised analytical sample in form of white needles shows M.Pt. 174–175° C.: the nitrogen determination is in good agreement with the formula $C_{17}H_{18}ON_2 \cdot C_7H_6O_3$ or $C_{24}H_{24}O_4N_2$: N percent calc. 6.92; N percent found 7.01.)

A solution of 18 g. of the above 5-benzyloxy-tryptamine salicylate in 540 cc. of ethanol is treated with hydrogen at five atm. pressure with continuous stirring (room temperature: about 25° C.) in presence of 9 g. of 10% palladium on carbon catalyst until no more hydrogen is adsorbed.

(i) From the filtered alcoholic solution containing 5-hydroxy-tryptamine salicylate, the indole base is separated as picrate by adding 10.3 g. of picric acid as already is described at the step (i) of Example 1. By evaporating the orange-red solution to a small volume crystalisation begins. The filtered 5-hydroxy-tryptamine picrate is washed with ether to eliminate any trace of salicylic acid and recrystallised from water; it is so obtained in form of red needles melting at 196–197° also when mixed with an authentic sample.

(l) If desired the 5-hydroxy-tryptamine may be also separated in the form of its hydrogen oxalate. For this purpose 5 g. of 5-hydroxy-tryptamine picrate are finely suspended in 25 cc. of N hydrochloric acid. This suspension is long pounded with a rod of glass and repeatedly extracted with ether so as eliminate picric acid; in this way a limpid aqueous solution of 5-hydroxy-tryptamine hydrochloride is obtained. The etheral solution is then washed with 10 cc. of N hydrochloric acid. The clear aqueous solution (cc. 35) is at first neutralised to Congo red with sodium bicarbonate and then adjusted to pH 7.8–7.9 by addition of sodium carbonate. The liquor is extracted repeatedly with butanol, washing butanolic extracts with a sodium chloride solution adjusted to pH 7.9 with potassium carbonate. To the butanolic solution, previously dried over sodium sulfate, 3 g. of oxalic acid in 25 cc. of ethanol are added and the butanol is then completely evaporated under reduced pressure. The residue is taken up with a small warm absolute ethanol and the alcoholic solution filtered with charcoal; by cooling and addition of dry ether the 5-hydroxy-tryptamine hydrogen oxalate separates off as pale buff microcrystals. A further recrystallisation from ethanol ether gives a colourless product, M.Pt. 195–197° C. (Analysis for $$C_{12}H_{14}O_5N_2$$

N percent calc. 10.52; N percent found 10.35.)

*Example 3*

(a) By the same procedure as described in the step (a) of Example 1 α-keto-adipic acid p.benzyloxy-phenylhydrazone is prepared.

(b) 125 g. of this compound is suspended in 500 cc. of anhydrous ether and treated with an excess of a diazoethane methylene chloride solution (prepared in its turn by treating 300 g. of crude moistened 80% nitroso ethylurea—obtained from propionamide according to the method of A. W. Hofmann, Br. 15, 754, 1882, and Werner, Soc. 115, 1100, 1919—with a concentrated aqueous potassium hydroxide solution in the presence of 3500 cc. of methylene chloride, analogously to what is described in Helv. Chim. Acta 24, 1474, 1941, with reference to the like nitroso methylurea and diazomethane). After 24 hours the excess of diazoethane is destroyed by shaking with dilute hydrochloric acid, and the methylene chloride is evaporated. The crude viscous diethyl-ester is dissolved in 3000 cc. of benzene; 1000 cc. of the solvent are distilled to eliminate azeotropically any moisture and into the boiling solution dry hydrogen chloride is bubbled over a period of one hour. The cooled reaction mixture is poured into an excess of an aqueous 5% sodium bicarbonate solution and the separated benzene layer is concentrated to a residual volume of about 300 cc. This residue is adsorbed on 2500 g. of aluminum oxide. Elution with hexane and hexane-benzene (1:1) gives fractions, which after crystallisation from ethanol shows M.Pt. 108–109° C.: the determination of the nitrogen content is in agreement with the constitution of diethyl-5-benzyloxy-indole-2-carboxy-3-β-propionate (for $C_{23}H_{25}O_5N$ N percent calc. 3.54; N percent found 3.70). The same procedure is followed using toluene and xylene (o, m, p. mixture) as solvent for the indole cyclisation. The same diethyl-ester is obtained.

This diethyl ester is hydrolysed in analogous way as described in the step (b) of Example 2 for the corresponding di-methyl ester.

(c) (d) (e) (f) (g) The so obtained 5-benzyloxy-indole-2-carboxyl-3-β-propionic acid is then converted in β-[3-(5-benzyloxy)-indolyl]-ethyl carbamic acid methyl ester according to procedure already described at the steps (c), (d), (e), (f) and (g) of Example 1.

(h) A 20 g. portion of the so obtained β-[3-(5-benzyloxy)-indolyl]-ethyl carbamic acid methyl ester is hydrolysed in a perfectly analogous way as described in the step (h) of Example 2. To the neutralised hydroethanolic solution filtered from sodium chloride, 9 g. of sodium benzoate are added. By concentration under reduced pressure, 5-benzyloxy-tryptamine benzoate as yellow needles, M.Pt. 148–149° C. is obtained. (An analytical sample twice recrystallised from water melts at 153–154° C. and the nitrogen content determination is in good agreement with the formula $C_{17}H_{18}ON_2 \cdot C_7H_6O_2$ or $C_{24}H_{24}O_3N_2$: N percent calc. 7.22, N percent found 7.40.)

Analogously as in Example 2 at the end of the step (h) an alcoholic solution of 9 g. 5-benzyloxy-tryptamine benzoate is treated with hydrogen in presence of 10% palladium on carbon catalyst.

(i) By addition of picric acid (5.15 g.) and concentration of the orange-red solution, the 5-hydroxy-tryptamine picrate is separated by handling as described at the end of the step (i) of Example 2.

(l) If desired, from the 5-hydroxy-tryptamine picrate may be prepared the 5-hydroxy-tryptamine oxalate, according to the directions described in Example 2 at step (l) for the corresponding hydrogen oxalate, with the sole difference that the oxalic acid is employed in calculated amount for obtaining the neutrum oxalate. The 5-hydroxy-tryptamine oxalate melts at 193–195° (dec.) after one crystallisation from ethanol. (Analysis for $2C_{10}H_{12}ON_2, C_2H_2O_4$ N percent calc. 12.7; N percent found 12.95.)

*Example 4*

(a) α-Keto-adipic acid p.benzyloxy-phenylhydrazone is prepared as described in the step (a) of Example 1.

(b) 125 g. of this dried product are at once treated with 1500 cc. of absolute ethanol containing 10% of dry hydrogen chloride and the mixture allowed to stand at room temperature for 24 hours is then refluxed for twenty minutes. The transitorily formed diethyl-ester is so directly transformed into the diethyl-5-benzyloxy-indole-2-carboxyl-3-β-propionate. This product is isolated by pouring the cooled reaction mixture into a cooled diluted solution of sodium bicarbonate and by filtering the solid slightly pitchy precipitate. The so obtained diethyl-ester after crystallisation from ethanol shows M.Pt. 108–109° and is indentical to the product obtained as said in the preceding Example 3 at step (b).

The step of esterification and indole cyclisation of α-keto-adipic acid p.benzyloxy-phenylhydrazone may be carried out in absolute methanol instead of absolute ethanol. In this case by same procedure as above reported the dimethyl-5-benzyloxy-indole-2-carboxyl-3-β-propionate is obtained. This product recrystallised from ethanol melts at 120–121° and is identical to the dimethylester obtained as said in the step (b) of Example 2.

The indole dicarboxylic ester (methyl or ethyl) is hydrolysed as described at step (b) of Example 2 to the corresponding 5-benzyloxy-indole-2-carboxyl-3-β-propionic acid.

(c) (d) (e) 80 g. of this indole dicarboxylic acid are then converted into 5-benzyloxy-indole-3-β-propionhydrazide by passing through the steps (c), (d) and (e) of Example 1.

(f) The 5-benzyloxy-indole-3-β-propionhydrazide so obtained (40 g.) is converted into the corresponding azide as reported in the step (f) of Example 1, with the sole difference that ether is employed in place of benzene.

(g) The ethereal solution of azide, about 650 cc. dried over powdered anhydrous sodium sulfate is added dropwise to 1300 cc. of boiling anhydrous ethanol in such a rate that ether distills off.

When all the ethereal solution has been added and distilled, the residual ethanolic solution is refluxed for one hour and then evaporated to dryness under reduced pressure thus obtaining a brownish oil. A concentrated benzene solution of this oil is poured over 65 g. of aluminium oxide and the β-[3-(5-benzyloxy)-indolyl]-ethyl carbamic acid ethyl ester is completely eluted by washing the aluminium oxide with benzene.

Evaporation of benzene solution to a small volume (about 130 cc.) and dilution with 13 cc. of hexane gives about 28 g. of the said ethyl urethane. The mother liquors were again treated with aluminium oxide so obtaining a further amount of the same product. Total yield 32.2 g.: M.Pt. 86–87° C. (An analytical sample twice recrystallised from benzene hexane melts at 87–88° C. The nitrogen determination is according to the formula $C_{20}H_{22}O_3N_2$: N percent calc. 8.28, N percent found 8.05.)

(h) A solution of 30 g. of the above ethylurethane in 1050 cc. of ethanol is treated with hydrogen with continuous stirring at five atm. pressure (room temperature: about 25° C.) in the presence of 10% palladium carbon catalyst until no more hydrogen is adsorbed (about five hours). The filtered solution, which contains β-[3-(5-hydroxy)-indolyl]-ethyl carbamic acid ethyl ester, is then evaporated under a reduced pressure to a volume of about 450 cc.

The crude solution of the so formed non-benzylated ethylurethane is refluxed with 150 cc. of dilute hydrochloric acid (1:1) for 30 minutes to hydrolyse the carbamic ester group. The green solution, after addition of 9 g. of crystallised sodium acetate, is neutralized to Congo red with sodium bicarbonate and filtered from the separated sodium chloride.

(*i*) 20.2 g. of picric acid are added to the filtrate, and most of the alcohol is evaporated under reduced pressure. The residual orange-red mixture is diluted to about 450 cc. with water, warmed to 60–65° and filtered with charcoal; by cooling 5-hydroxy-tryptamine picrate separates off as red needles M.Pt. 185–187° C. with dec.; after concentration of the mother liquors under reduced pressure a further amount of the same picrate is obtained.

(*l*) If desired the 5-hydroxy-tryptamine may be separated in the form of its well known double salt with creatinine: 5-hydroxy-tryptamine-creatinine sulfate. For this purpose 10 g. of 5-hydroxy-tryptamine picrate are converted in 5-hydroxy-tryptamine hydrochloride as described at step (*l*) of Example 2. To the obtained aqueous solution, neutralised to Congo red with sodium bicarbonate, 2.7 g. of creatinine, 420 cc. of ethanol, 23.5 cc. of 2 N sulfuric acid are added. The resulting suspension is heated to boiling and then cooled at 0° C. 5-hydroxy-tryptamine-creatinine-sulfate separates off as a white crystalline precipitate. The product is filtered on a Büchner funnel, washed with alcohol and dried. Yield 7.9 g.: M.Pt. 210–211° C. with dec. (A water recrystallised sample melts at 213–214° C.)

*Example 5*

(*a*) α-Keto-adipic acid p.benzyloxy-phenylhydrazone is prepared as described in the step (*a*) of Example 1.

(*b*) 128 g. of this product are refluxed for twenty minutes with 1500 cc. of a 10% solution of dry hydrogen chloride in sec. butyl carbinol (active amyl-alcohol of fermentation). The cooled reaction mixture, washed firstly with an excess of 5% aqueous sodium bicarbonate solution and then with water until neutral, is dried and evaporated to dryness under reduced pressure. Chromatography on aluminium oxide of a concentrated benzene solution of the residue, gives, by elution with hexane and hexane-benzene (1:1), the di-2-methylbutyl-5-benzyloxy-indole-2-carboxy-3-β-propionate in the form of a viscous colourless oil. Saponification of this ester with a warm alcoholic solution of sodium hydroxide gives 90 g. of 5-benzyloxy-indole-2-carboxyl-3-β-propionic acid.

(*c*) This indole dicarboxylic acid (90 g.) is refluxed with 720 cc. of boiling tetrahydronaphthalene for seven hours, until the evolution of carbon dioxide has ceased. After cooling, the separated crystalline product is filtered and dried: 66 g. of 5-benzyloxy-indole-3-β-propionic acid, melting at 153–157° C., are obtained. Concentration of the mother liquors under reduced pressure gives a second crop of 6.4 g. melting at 151–155° C. The total yield of 5-benzyloxy-indole-3-β-propionic acid amounts in this way to about 92% of the theoretical amount; the product is satisfactory for the next step. (A mixed melting point of a sample recrystallised from aqueous ethanol with a pure sample of the indole monocarboxylic acid gives no depression.) By extraction of the residual mother liquor with a dilute aqueous sodium bicarbonate solution and following acidification thereof, 5.5 g. of a mixture of mono- and not changed bi-carboxylic acid melting at 171–176° C. are obtained. This third crop may be recycled so giving a further small amount of 5-benzyloxy-indole-3-β-propionic acid.

The same procedure has been experienced using decahydronaphthalene as solvent for the decarboxylation: a similarly good yield of the same indole-mono-carboxylic acid is obtained.

(*d*) A solution of 72 g. of 5-benzyloxy-indole-3-β-propionic acid in 720 cc. of isoamyl alcohol containing 3% of dry hydrogen chloride is refluxed over a period of two hours. After cooling, the mixture is first washed with an excess of a dilute aqueous sodium bicarbonate solution and then with water until neutral thus obtaining an isoamyl alcohol solution of isoamyl-5-benzyloxy-indole-3-β-propionate.

(To recognize the presence of this ester, a sample—35 cc.—of this solution is dried over magnesium sulfate and then evaporated to dryness in vacuo. A concentrated benzene solution of the residual brownish oil is chromatographed on 50 g. of aluminium oxide. After complete elution with hexane, benzene and a mixture consisting of equal volumes of benzene and ether, followed by evaporation of eluates under reduced pressure, the isoamyl ester is obtained as a pale yellow glass: 3.2 g. The latter is dissolved in 70 cc. of ethanol at 40° C. and hydrolysed by adding a solution of 2.8 g. of sodium hydroxide in 7 cc. of water. After standing at room temperature (about 25° C.) during 24 hours, the mixture is cooled to 0° C. and the separated sodium salt, filtered on a Büchner funnel and washed with ethanol. An aqueous concentrated solution of the sodium salt, is acidified with dilute hydrochloric acid and the precipitate filtered, washed thoroughly with water and dried. The product—about 2.1 g. of white crystals melting at 161–162° C.—is recognised as 5-benzyloxy-indole-3-β-propionic acid by a mixed melting point with an authentic sample.)

(*e*) The above isoamyl alcohol solution containing the main fraction of isoamyl ester is refluxed with 100 cc. of hydrazine hydrate for one hour. After cooling, the solution containing the 5-benzyloxy-indole-3-β-propionhydrazide is transferred to a separating funnel and repeatedly washed with water and, finally, with water containing a little hydrochloric acid to eliminate the excess of hydrazine. (A 35 cc. sample of the dried isoamyl-alcohol solution after evaporation in vacuo gives a crystalline residue which, after crystallisation from dilute ethanol, melts at 135–136° C. and gives no depression when mixed with an authentic sample of 5-benzyloxy-indole-3-β-propionhydrazide.)

(*f*) To the above isoamyl alcohol solution of the hydrazide a solution of 18 g. of sodium nitrite in 180 cc. of water is added. After cooling to 0° C. and stirring 22.2 cc. of concentrated hydrochloric acid diluted with 50 cc. of water are dropped in the mixture. After standing for five minutes the isoamyl alcohol layer is separated and the aqueous phase extracted with 350 cc. of isoamyl alcohol. The combined extracts, washed firstly with a dilute aqueous sodium bicarbonate solution and then with water until neutral, are dried over anhydrous potassium carbonate.

(*g*) The filtered isoamyl alcohol solution, containing the 5-benzyloxy-indole-3-β-propionazide, is refluxed for one hour in a round-bottomed flask, employing an apparatus equipped in such a way that the isoamyl alcohol refluxing in the flask was dried by contact with phosphoric anhydride. Formation of the isoamyl urethane occurs. (A 35 cc. sample of the obtained solution is evaporated to dryness under reduced pressure. A concentrated benzene solution of the residual brownish oil is poured into 10 g. of aluminium oxide. Elution with benzene and evaporation to dryness of the eluates gives the β-[3-(5-benzyloxy)-indolyl]-ethyl carbamic acid isoamyl ester as a pale yellow glass which does not crystallise.)

(*h*) The above isoamyl alcohol solution containing the isoamyl urethane is treated with hydrogen under continuous stirring at five atm. pressure (room temperature: about 25° C.) in presence of 28 g. of 10% palladium on carbon catalyst until no more hydrogen is adsorbed (about five hours). The filtered isoamyl alcohol solution contains β-[3-(5-hydroxy)-indolyl]-ethyl carbamic acid isoamyl ester. It is then evaporated to dryness under reduced pressure.

The residue is taken up with 720 cc. of ethanol and after the addition of 120 cc. of water and 120 cc. of concentrated hydrochloric acid is refluxed for 30 minutes in order to hydrolyse the carbamic ester group. The greenish solution, after addition of 14.4 g. of crystallised sodium acetate, is neutralised to Congo red with sodium bicarbonate and filtered from the separated sodium chloride.

(i) 36 g. of picric acid are added to the filtrate and most of the alcohol is evaporated under reduced pressure. Water warmed to 65° C. is added to a volume of about 550 cc. The warm solution is filered with charcoal: by cooling 5-hydroxy-tryptamine picrate separates off as red needles M.Pt. 185-187° with dec.: after concentration of the mother liquors under reduced pressure a further amount of the same picrate is obtained. (A sample recrystallised from water melts at 195-196° C. and a mixed melting point with a pure sample of 5-hydroxytryptamine picrate gives no depression.)

*Example 6*

(a) (b) 5 benzyloxy - indole - 2 - carboxyl - 3 - β - propionic acid is prepared as described in the steps (a) and (b) of Example 1.

(c) 80 g. of this indole dicarboxylic acid are converted into 5-benzyloxy-indole-3-β-propionic acid (64 g.) according the step (c) of Example 5.

(d) A solution of 64 g. of the above crude indolemonocarboxylic acid in 640 cc. of absolute ethanol containing 3% of dry hydrogen chloride is refluxed for two hours. After cooling the mixture is poured into a solution of 65 g. of sodium bicarbonate in 1300 cc. of water thus obtaining 65.5 g. of the crude ethyl-5-benzyloxy-indole-3-β-propionate which after crystallisation from hexane melts at 62-63° C. and is in good agreement with the formula $C_{20}H_{21}O_3N$: N percent calc. 4.33, N percent found 4.48).

(e) A mixture of 65 g. of the above ethyl ester, 1750 cc. of ethanol and 93 cc. of hydrazine hydrate is refluxed for one hour. By treating the solution in the same way as described in the step (e) of Example 1 for the transformation of the corresponding methyl ester into the hydrazide, 60.5 g. of crude 5-benzyloxy-indole-3-β-propionhydrazide, M.Pt. 133-134° C. are obtained. (The mixed melting point with a pure sample gives no depression.)

(f) 60 g. of this hydrazide are converted into the azide using acetic acid and sodium nitrite according to the directions of Example 1 at step (f).

(g) The so obtained dried benzene solution (about 900 cc.), containing the 5-benzyloxy-indole-3-β-propionazide, is added dropwise to 76 cc. of anhydrous benzyl alcohol warmed at 130° C. in an oil bath: continuous distillation of benzene occurs. The solution is warmed at 130° C. for 30 minutes more after complete distillation of benzene. 76 cc. of xylene are added and the resulting brown solution is evaporated to dryness under reduced pressure. The residual oil is dissolved in 80 cc. of benzene and poured into a column of 1000 g. of aluminium oxide.

After complete elution with benzene the eluted solution is concentrated under reduced pressure to about 90 cc.: addition of 15-20 cc. of hexane causes the crystallisation of 50.3 g. of β-[3-(5-benzyloxy)-indolyl]-ethyl carbamic acid benzyl ester, as white needles melting at 70-72° C. The mother liquors are again treated with aluminium oxide so obtaining a further crop of the same product. Total yield 60 g. (77% of the theoretical amount). (An analytical sample recrystallised from benzene-hexane melts at 72-73° C. and the determination of nitrogen content is in good agreement with the formula $C_{25}H_{24}O_3N_2$: N percent calc. 7, N percent found 6.81.)

(h) To a solution of 60 g. of the above benzylurethane in 6 l. of ethanol and 144 cc. of normal hydrochloric acid, 30 g. of 10% palladium on carbon catalyst are added. The mixture is treated with hydrogen with continuous stirring at six atm. pressure (room temperature: about 25° C.) until no more hydrogen is adsorbed.

(i) To the so-obtained ethanolic solution, filtered from the catalyst, containing the 5-hydroxy-tryptamine hydrochloride, 34.5 g. of picric acid are added. Elimination of the ethanol under reduced pressure to a volume of 850 cc. causes the crystallisation of most of the 5-hydroxy-tryptamine picrate as red needles: 45.5 g., M.Pt. 185-186° C. By concentration of the mother liquors further crops of crystals are collected: the total yield amounted to 60 g. (about 95%). (A mixed melting point of a water recrystallised sample with pure 5-hydroxy-tryptamine picrate gives no depression.)

(l) The 5-hydroxy-tryptamine may be separated from the alcoholic solution, after the palladium-hydrogen treatment, in the form of its double salt with creatinine (sulfate). The handling is as follows: to an ethanolic solution—obtained by treatment of 60 g. of benzylurethane with hydrogen in presence of 10% palladium on carbon catalyst according to the above directions—17 g. of creatinine and then 150 cc. of 2 N sulfuric acid are added. The mixture is heated to boiling with stirring and then cooled to 0° C.; 5-hydroxy-tryptamine creatinine sulfate separates off as a white crystalline precipitate. The product is filtered on a Büchner funnel, washed with ethanol and dried: yield 55.5 g.: M.Pt. 210-211° C. with dec. (A water recrystallised sample melts at 213-214° C. with dec. and not gives depression when mixed with an authentic sample of 5-hydroxy-tryptamine-creatinine-sulfate.)

We have again experienced that, after the benzene solution of the 5-benzyloxy-indole-3-β-propionazide (from 60 g. of hydrazide) has been reacted with benzyl alcohol and all the benzene distilled, the crude benzyl alcohol solution of the β-[3-(5-benzyloxy)-indolyl]-ethyl carbamic acid benzyl ester, when diluted to 6 l. with ethanol containing 144 cc. of N hydrochloric acid, may be directly submitted to palladium-hydrogen treatment in a perfectly analogous way. In this case all the benzyl alcohol present is transformed into toluene. After elimination of the catalyst from the hydrogenated solution, 5-hydroxy-tryptamine picrate, as well as 5-hydroxy-tryptamine-creatinine-sulfate, is obtained in a similar high yield.

This application is a division of our application Serial No. 566,776, filed February 21, 1956.

What we claim is:

1. A process for the preparation of 5-hydroxytryptamine which comprises the steps of hydrogenolizing a β-[3-(5-benzyloxy)indolyl]-ethyl carbamic acid ester of the formula

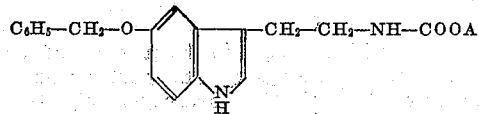

where A is selected from the group consisting of lower alkyl radicals containing up to 5 carbon atoms and benzyl radical by treatment with hydrogen in the presence of a palladium catalyst, and hydrolysing the resulting β-[3-(5-hydroxy)-indolyl]-ethyl-carbamic acid ester of the formula

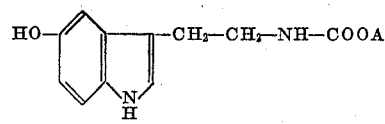

where A is as defined above with an aqueous acid to produce 5-hydroxy-tryptamine.

2. In a process for the preparation of 5-hydroxy-tryptamine the steps of hydrogenolizing, in an alcohol solution, a β-[3-(5-benzyloxy)-indolyl]-ethyl carbamic acid ester of the formula

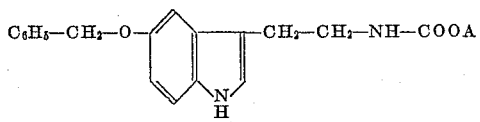

where A is selected from the group consisting of lower alkyl radicals containing up to 5 carbon atoms and benzyl radical, by treatment with hydrogen in the presence of a palladium catalyst, and hydrolysing the resulting β-[3-(5-hydroxy)-indolyl]-ethylcarbamic acid ester of the formula

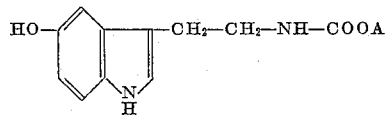

where A is as defined above with an aqueous mineral acid to produce 5-hydroxytryptamine.

3. In a process for the preparation of 5-hydroxytryptamine the steps of hydrogenolizing in an alcohol solution a β-[3-(5-benzyloxy)-indolyl]-ethylcarbamic acid ester of the formula

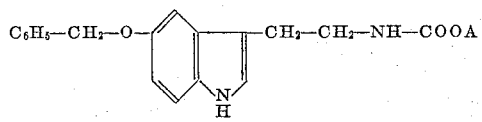

where A is selected from the group consisting of lower alkyl radicals containing up to 5 carbon atoms and benzyl, by treatment with hydrogen, in the presence of a palladium catalyst, and hydrolysing in the same alcoholic solution the resulting β-[3-(5-hydroxy)-indolyl]-ethylcarbamic acid ester of the formula

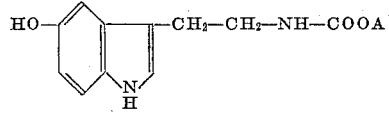

where A is as defined above with an aqueous mineral acid to produce 5-hydroxytryptamine.

4. In a process for the preparation of 5-hydroxytryptamine the steps of hydrogenolizing in an alcohol solution, β-[3-(5-benzyloxy)-indolyl]-ethylcarbamic acid benzyl ester of the formula

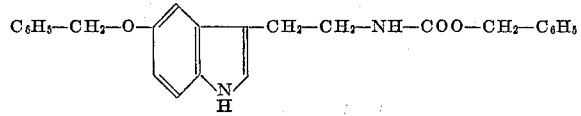

by treatment with hydrogen in the presence of a palladium catalyst, and hydrolysing in the same alcoholic solution the corresponding β-[3-(5-hydroxy)indolyl]-ethylcarbamic acid benzyl ester with an aqueous mineral acid to produce 5-hydroxytryptamine.

5. The process for the preparation of 5-hydroxytryptamine which comprises simultaneously hydrogenolizing and hydrolysing β-[3-(5-benzyloxy)-indolyl]-ethylcarbamic acid benzyl ester of the formula:

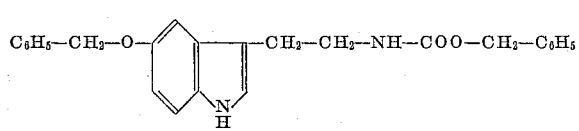

by treatment with hydrogen in the presence of a palladium catalyst, in a hydroalcoholic medium containing a mineral acid, to produce 5-hydroxytryptamine.

6. In a process for the preparation of 5-hydroxytryptamine the steps of heating 5-benzyloxy-indole 3β-propionazide, to between about 60 and about 140° C. with an alcohol selected from the group consisting of aliphatic alcohols containing up to 5 carbon atoms and benzyl alcohol to produce a β-[3-(5-benzyloxy-indolyl)]ethyl carbamic acid ester of the alcohol employed hydrogenolyzing the thus produced β-[3-(5-benzyloxy)indolyl]-ethylcarbamic acid ester by treatment with hydrogen in the presence of a palladium catalyst and hydrolysing the corresponding β-[3-(5-hydroxy-indolyl)]ethyl carbamic acid ester with an aqueous mineral acid to produce 5-hydroxytryptamine.

7. β-[3-(5-benzyloxy)-indolyl]-ethylcarbamic acid esters of the formula

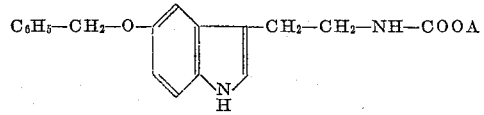

where A is selected from the group consisting of lower alkyl radicals containing up to 5 carbon atoms and benzyl.

References Cited in the file of this patent
UNITED STATES PATENTS

| | | |
|---|---|---|
| 2,416,258 | Jenkins et al. | Feb. 18, 1947 |
| 2,468,912 | Albertson | May 3, 1949 |
| 2,789,984 | Speeter | Apr. 23, 1957 |

FOREIGN PATENTS

| | | |
|---|---|---|
| 766,036 | Great Britain | Jan. 16, 1957 |
| 770,370 | Great Britain | Mar. 20, 1957 |

OTHER REFERENCES

Murphy: Jour. Am. Pharm. Assoc., vol. 30, pp. 83–85 (1943).
Hill and Kelly: Organic Chemistry, 1943, p. 288.
Berg et al.: J. Bio. Chem., vol. 85 (1930), pp. 219–231.
Manske et al.: J. Chem. Soc. (1927), pp. 240–242.
Weygand: Organic Preparations, 1945, Interscience Publishers, Inc., New York, p. 467.